Figure 9:
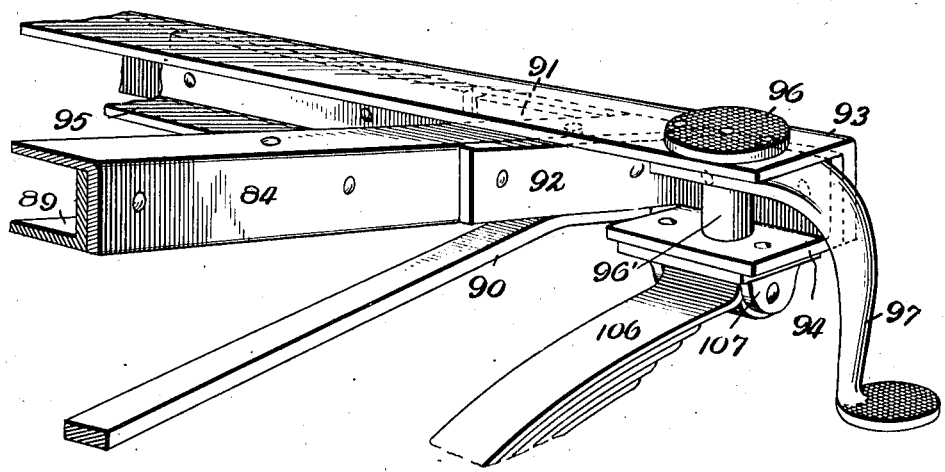

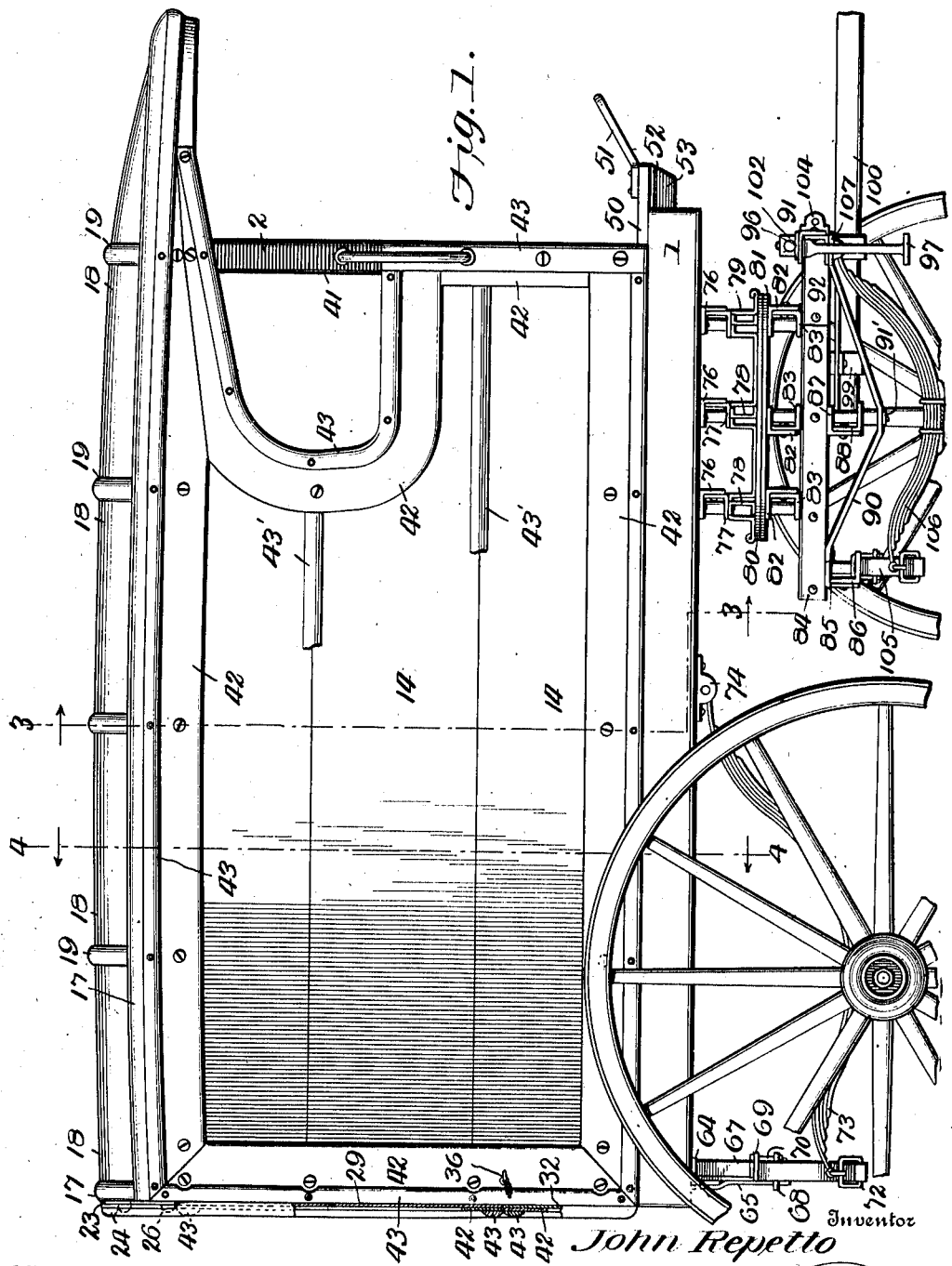

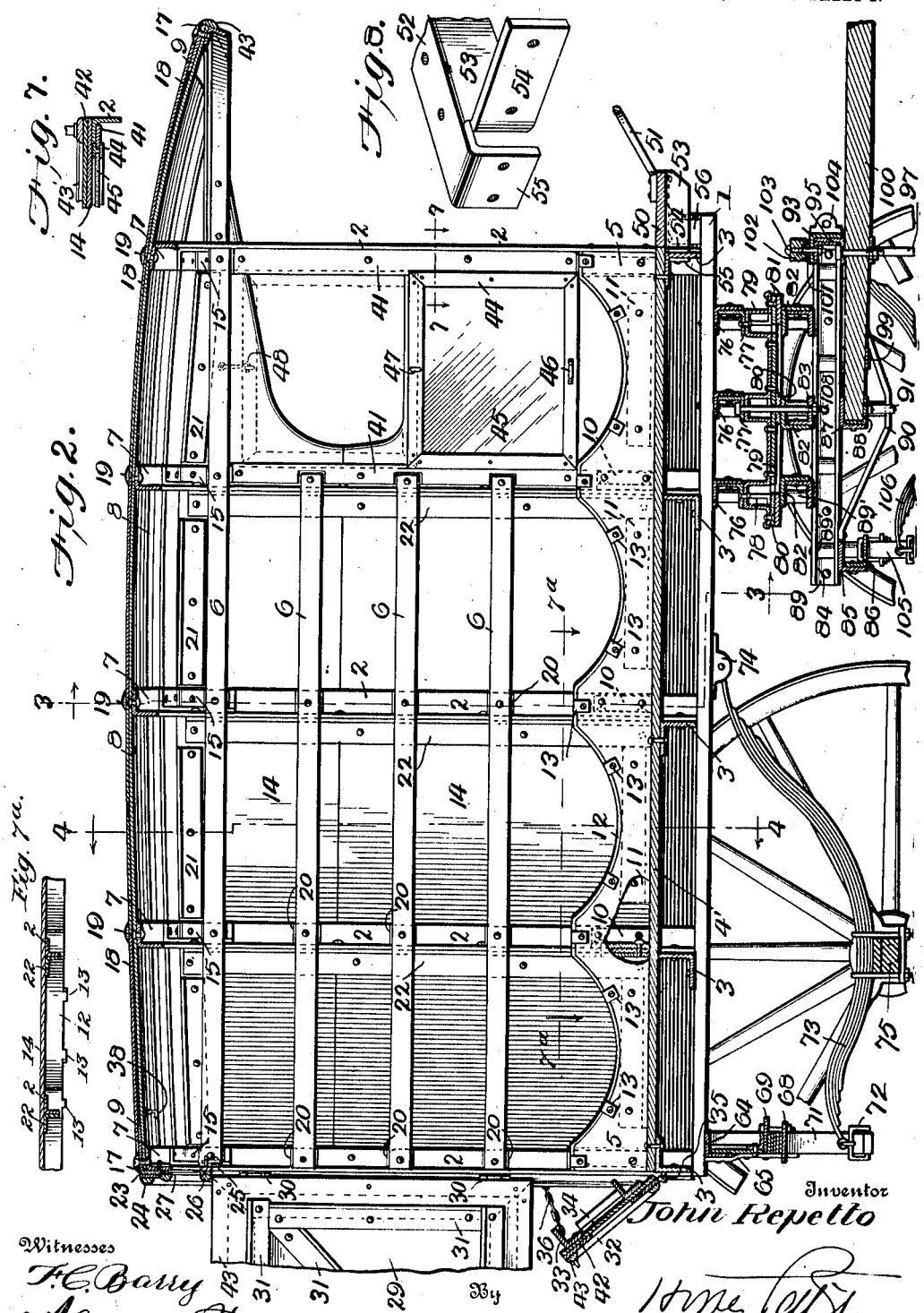

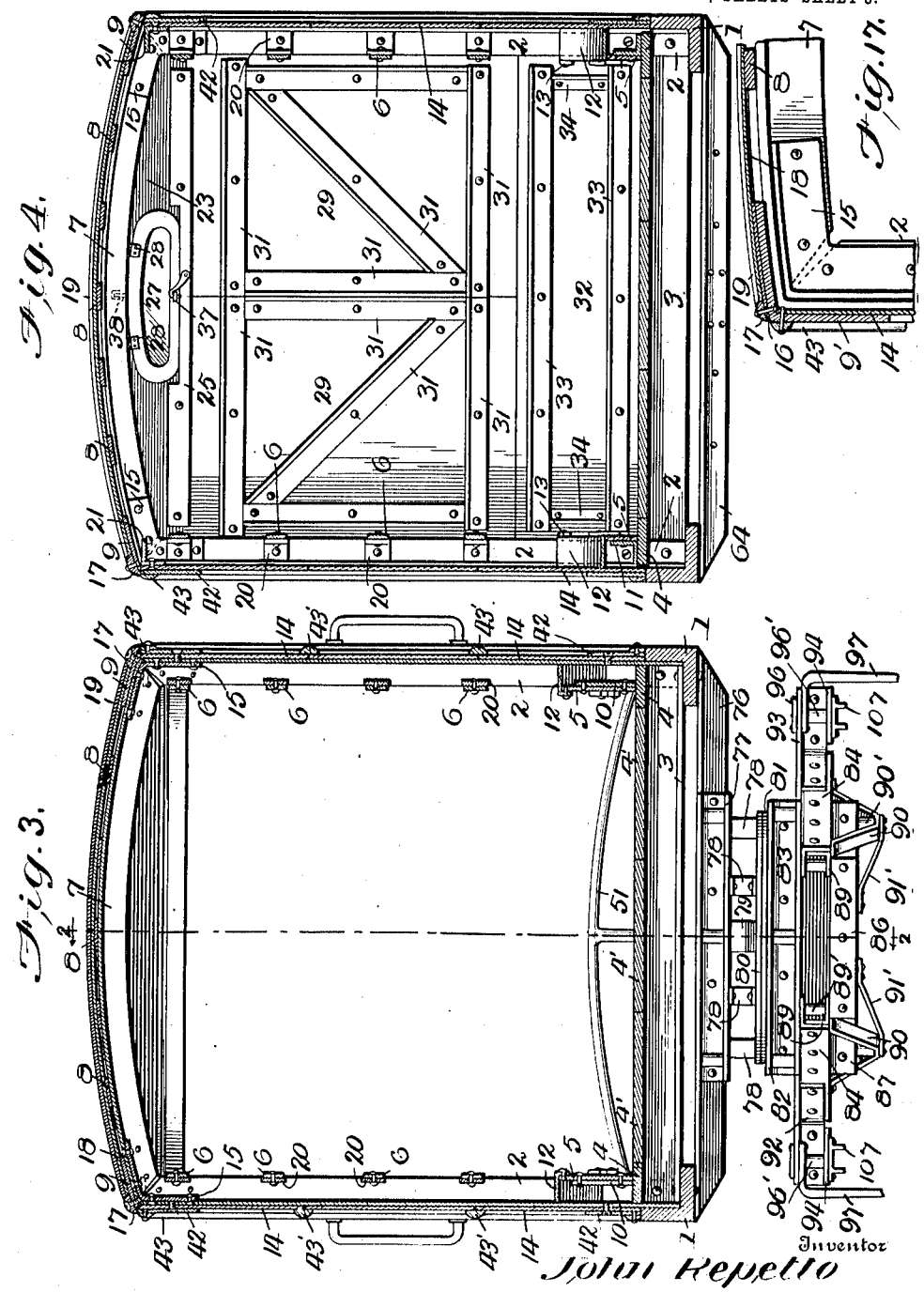

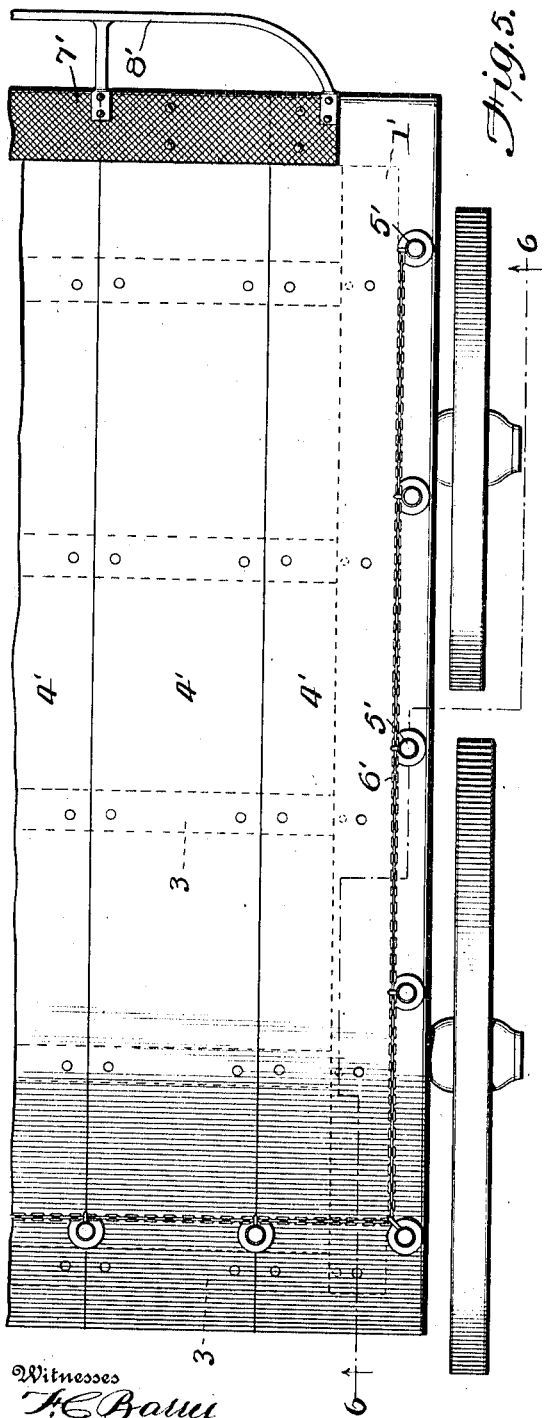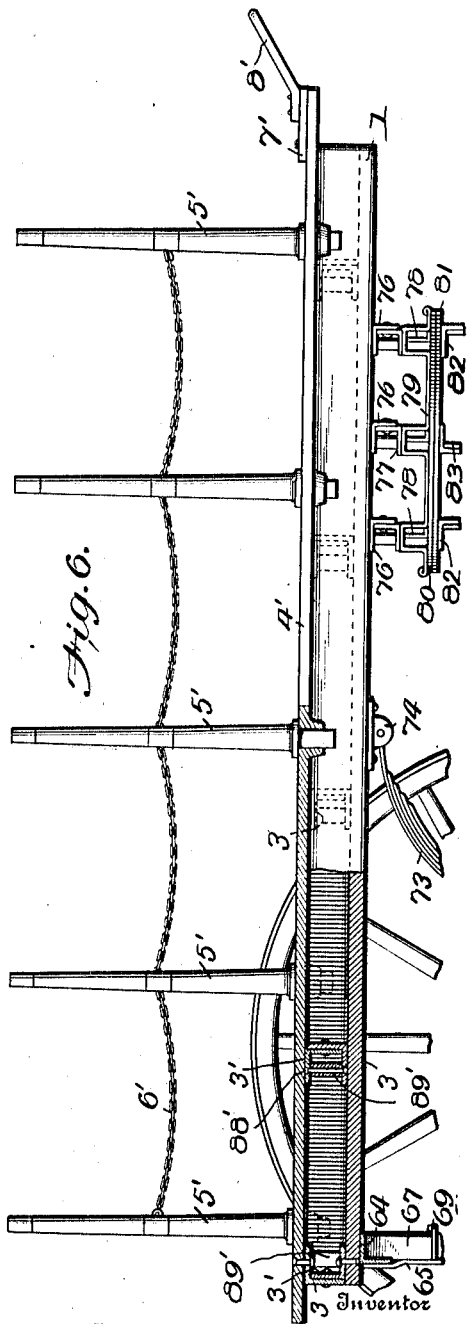

J. REPETTO.
VEHICLE.
APPLICATION FILED MAR. 31, 1906.

993,796.

Patented May 30, 1911.
7 SHEETS—SHEET 5.

Witnesses
F. C. Barry
Alexander Park

Inventor
John Repetto

By
[signature]
Attorney

J. REPETTO.
VEHICLE.
APPLICATION FILED MAR. 31, 1906.
993,796.
Patented May 30, 1911.
7 SHEETS—SHEET 6.
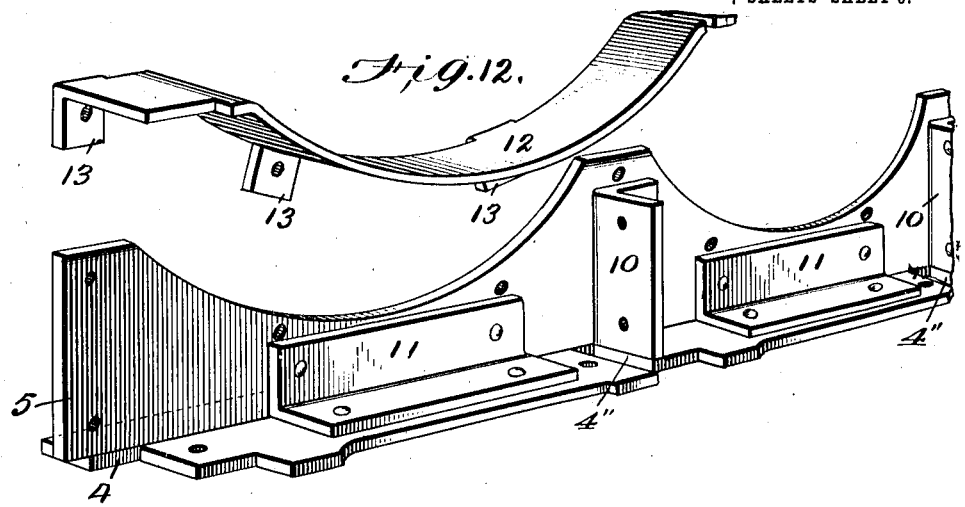
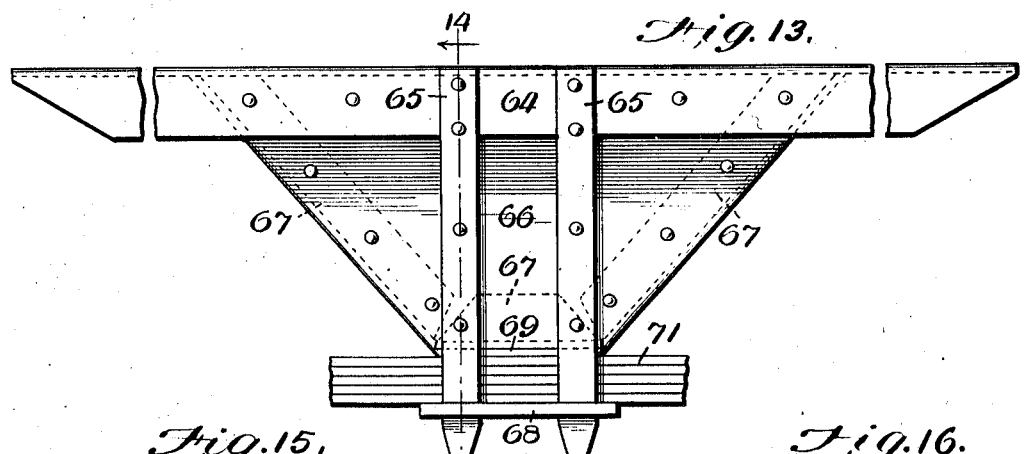
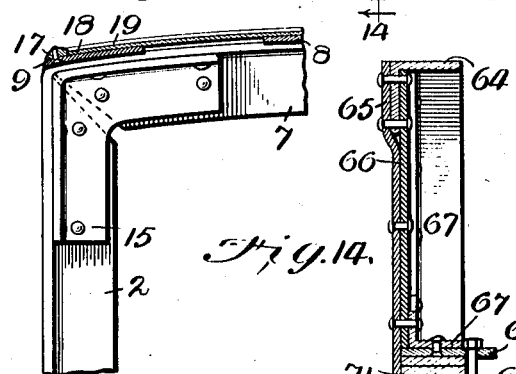
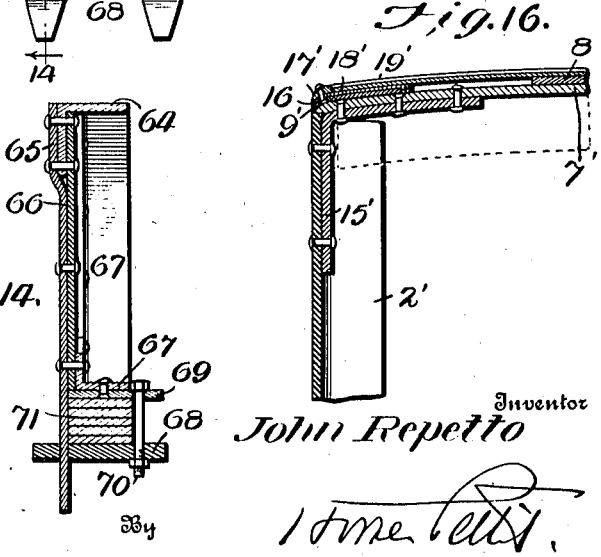
Inventor
John Repetto

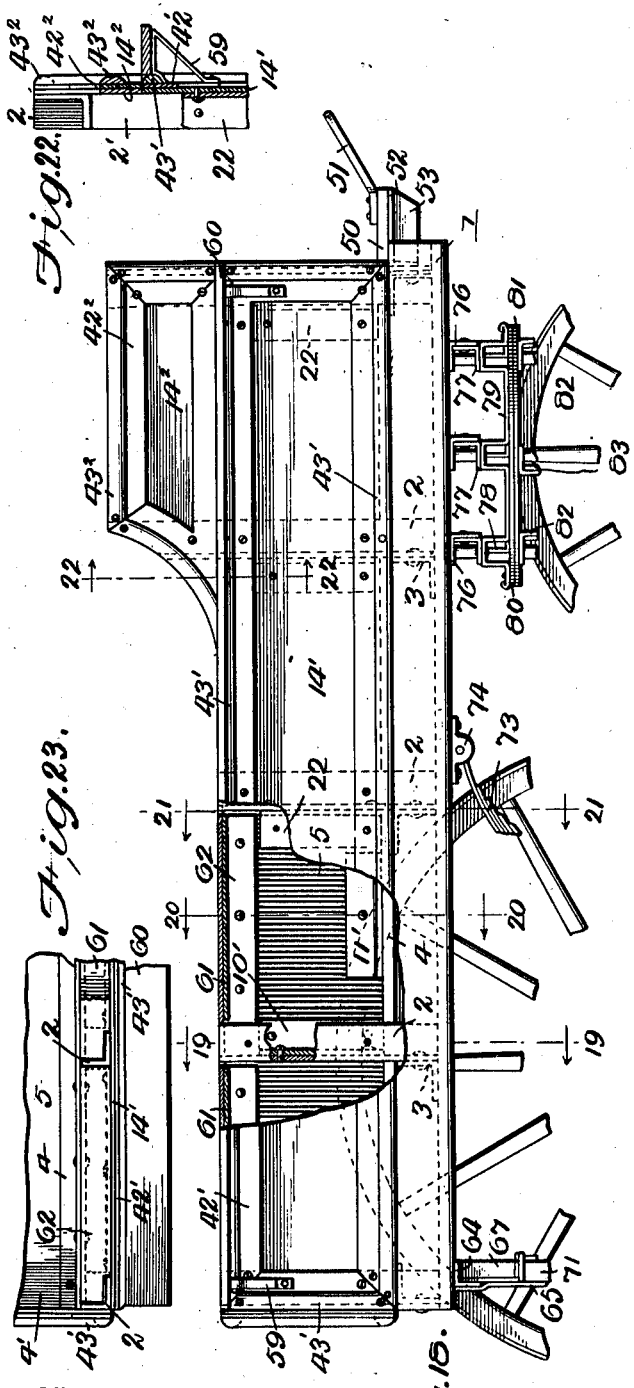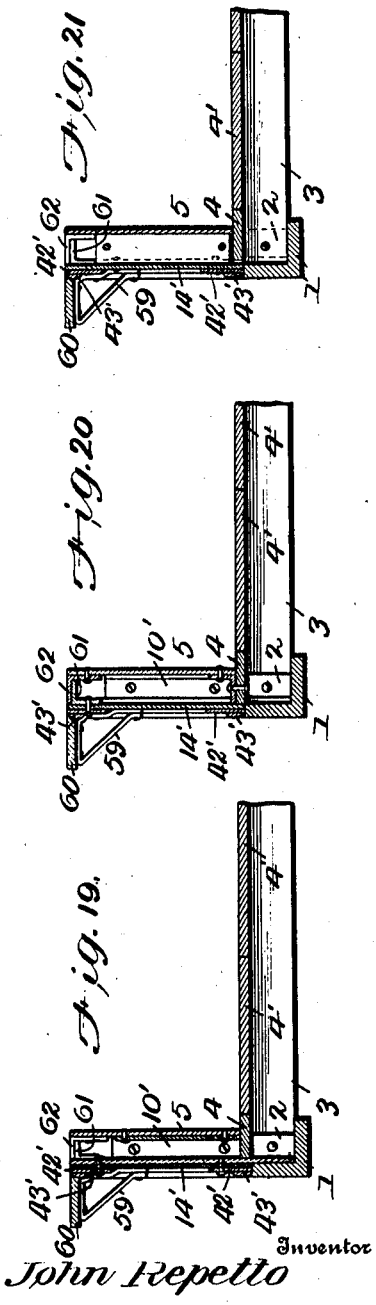

UNITED STATES PATENT OFFICE.

JOHN REPETTO, OF PHILADELPHIA, PENNSYLVANIA.

VEHICLE.

993,796.

Specification of Letters Patent.   Patented May 30, 1911.

Application filed March 31, 1906.  Serial No. 309,056.

*To all whom it may concern:*

Be it known that I, JOHN REPETTO, a citizen of the United States, and a resident of Philadelphia, State of Pennsylvania, have invented certain new and useful Improvements in Vehicles, of which the following is a full, clear, and complete disclosure.

My invention relates to vehicles, and particularly to that class of metallic vehicles which have their body portion, top and supporting mechanism made up in greater part of metallic strips and angle irons.

The object of my invention is to so construct a vehicle that the peculiar shape and arrangement of the different parts produce great durability, strength and lightness to the same.

This object in view, my invention consists in the details of construction and manner of operation hereinafter described, reference being made to the accompanying drawings, in which like characters refer to corresponding parts.

Referring to the drawings, Figure 1 is a side elevation of a vehicle constructed in accordance with this invention, one of the front wheels being removed; Fig. 2 is a longitudinal section of the same taken on the line 2—2 of Fig. 3; Fig. 3 is a transverse section of the same taken on line 3—3 of Fig. 2; Fig. 4 is another transverse section taken on line 4—4 of Fig. 2; Fig. 5 is a plan view of a modification of my invention and Fig. 6 is a partial elevation and a section thereof taken on line 6—6 of Fig. 5; Fig. 7 is a fragmentary plan section taken on line 7—7 of Fig. 2; Fig. 7ª is a fragmentary section taken on the line 7ª—7ª of Fig. 2; Figs. 8, 9, 10 and 11 are detail views of a part of the front supporting means; Fig. 12 is a detail view of part of the body portion; Figs. 13 and 14 are detail views of the rear supporting mechanism; Fig. 15 is a detail view of a part of the body portion; Figs. 16 and 17 are modifications of Fig. 15; Fig. 18 is an elevation of a modified form of this invention and Figs. 19, 20, 21, 22 and 23 are fragmentary transverse sections of the same.

Referring to the drawings, one embodiment of this invention comprises a vehicle having a body, the lower side edges of which are formed by two floor beams 1, substantially L-shaped in cross section, and each having one web arranged in a vertical plane, and its other web projecting horizontally inwardly therefrom. Projecting vertically upwardly from within these floor beams, and having their lower ends supported upon the upper sides of the horizontal webs of the same, are vertical angle bars 2, arranged at intervals on each floor beam, and forming a part of the frame work of each side of the body of the vehicle. Each of these vertical angle bars is substantially L-shaped in cross section, having one web extending in a plane longitudinally of the vehicle, and its other web in a plane transversely of the vehicle. Extending transversely of the body of the vehicle and bridging the space between the floor beams 1, are transverse spaced angle bars 3, each having a horizontal web and a vertical web, the ends of these transverse bars resting upon the upper sides of the horizontal webs of the floor beams 1. The vertical webs of these transverse bars are bolted to the transverse webs of the vertical angle bars 2, and the horizontal webs of each alternate transverse bar are bolted to the horizontal webs of the floor beams.

Extending the entire length of the vehicle on each side thereof are the longitudinal flat plates 4—4, resting on and bolted to the angle bars 3—3, said plates 4—4 being notched as at 4" to allow the web of the vertical bars 2 to pass therethrough. Between the longitudinal plates 4—4 and presenting a flush surface with the same is the floor plate 4', which is supported on the transverse beams 3. The floor may be made out of one single plate or a plurality of plates, as desired. Projecting upwardly from each longitudinal plate 4—4 are the vertical walls 5—5, extending the entire length thereof. Extending transversely to the vertical beams 2—2 and at intervals one above the other are the longitudinal bars or ribs 6. Bridging the space between each pair of oppositely arranged vertical angle bars 2—2 are the arched angle bars or ribs 7, which may be formed in one straight piece with the angle bars 2, having a portion thereof cut away to enable it to be bent substantially at right angles with the bar 2, as shown in Fig. 15, or the bar 7 may be made in a separate piece and bolted to the bar 2', as shown in Fig. 16, as will be hereinafter described. Resting on the angle bars 7 are the longitudinal flat ribs 8 and around the edges of the entire top of the body and resting on the bars 7 is the continuous flat marginal bar 9. The vertical walls 5 are fastened to the angle bars 2 by the vertical angle pieces 10, and the vertical wall 5 is fastened to the longitudinal beam 4 by the horizontal angle piece 11. The upper edge of the wall 5 is curved downwardly between each of the vertical angle bars 2, and riveted over this edge and projecting outwardly is the plate 12 as shown in Fig. 7ª, having the rivet lugs 13, the purpose of which plate 12 is to cover the space between the vertical wall 5 and the side 14 of the cover. To the outside portion of the angle bars 2 are fastened the side panels or covers 14 of the vehicle, each of which panels may consist of a single plate or a plurality of plates, as shown, the abutting edges being covered with beads 43'. The vertical angle bars 2 and the top transverse bars 7 are bolted together by means of an angle piece at 15, as shown in Fig. 15.

To the top of the body frame and over the longitudinal ribs 8 is fastened the cover plate 18, along the side edges of which are the beads 17 and extending transversely over the same are the beads 19. The said cover plate may be fastened by means of the beads 17 and 19 alone or by being soldered to a brass plate 16, as shown in Fig. 16, in which modification 2' represents a vertical bar, 7' the transverse bar fastened thereto by the angle piece 15', 8' the longitudinal top bars, over which extends the cover 18', held in position by the beads 17' and 19', and also by being soldered to the piece 16, as before mentioned, which piece is riveted to the edge strip 9'. The longitudinal bars 6 are fastened to the projecting webs of the angle bars 2 by means of the angle pieces 20, each of which is bolted to its respective part. On the inside of the panels 14 are longitudinal angle pieces 21, having one web bolted to the panel for the purpose of stiffening the same. The exterior of each side cover is bounded by the marginal plates 42 and the beads 43 which extend around the entire edge thereof.

To the panels 14 is bolted one flange of each of the vertical pieces 22, the other flanges of which are bolted to the vertical angle bar 2. To the rear of the body portion and at the upper end thereof is fastened the panel plate 23 by means of the bead 24, which bounds the upper and lateral edges of the same. To the lower edge of the panel 23 and on the inner side thereof is bolted the plate 25, which is recessed at its middle portion to make room for a door 27 over an aperture in the panel 23, which aperture is bound around its outer edges by the bead 26, the door being hinged at 28 to the angle bar 7. Below the panel 23 are the doors 29, hinged at 30—30 to the vertical angle bars 2. Extending transversely across each of said doors and bolted to the same are the stiffening angle bars 31—31, which bars also serve as a frame to which the cover plate is fastened. Below said door 29 is the tail-board 32, bolted to which and extending transversely of the same are the stiffening angle bars 33—33. Between the latter bars and bolted to the tail-board 32 are the vertical angle bars 34—34. Said tail-board 32 is hinged at 35 to the rear-most transverse angle bar 3 and is held in its open position in the usual manner by a chain 36. The door 27 in the panel 23 has an eye 37 on its inner and lower edge, which may be fastened to the hook 38, to hold the door in its open position. The beads 17 and 43 extend around the sides and the front of the top portion. The side and rear panels or covers are inclosed upon their peripheral edges by the plates 42, which are held in position by screws passing through the panels into the flanges of the angle bars. The side walls of the vehicle are cut away at their upper forward portion, as shown in Figs. 1 and 2. The edge of the cut away portion is bound by the bead 43, fastened to the marginal plate 42, which is in turn fastened to the panel 14 and the angle bars 2 in the manner hereinbefore described. This cut away portion may be opened and closed by a window which consists of a frame 44, inclosing a glass pane 45, the said frame being recessed on its sides to slide on plates 41—41, which are bolted to the angle bars 2—2. The said window frame 44 has a handle 46 along its bottom rail and an eye 47 on its top rail, which eye is adapted to be held when the window is in its raised position by the hook 48 pivoted to the upper longitudinal plate 6. Extending forwardly from the front of the beams 1—1 is the dash-board 50, from which projects the rail 51. The dash-board is supported by means of a peculiar angle piece illustrated in Fig. 8, in which 52 represents a portion bolted to the under side of the dash-board. 53 is a vertical flange, which is bent at right angles adjacent to the front side of the transverse angle bar 3 into a plate 54. The flange 52 of said angle piece extends through a slot in the vertical flange of the angle bar 3, and is then turned downwardly to form a flange 55. The flanges 54 and 55 are bolted respectively to the vertical flange of the angle bar 3, the one flange being on the outside and the other on the inside of said angle bar.

In Fig. 17 I have illustrated a modification which differs from that of my preferred form in that the marginal top plate 9 and the marginal side plate 42 are formed in one piece in the shape of an angle bar along the upper side edges of the body portion. This angle bar is indicated at 9' and has the upper edge of the panel 14 terminating inside of and against the under surface of its top portion. The cover 18 is soldered to the brass plate 16, the latter, together with the bead 17, being riveted to said angle bar, as is also the bead 43.

In Figs. 5 and 6 I have illustrated a modification of the vehicle body, in which the side and top portions are eliminated. The construction of the floor section in this modification is similar to that hereinbefore described, and consists of the longitudinal L-shaped beams 1—1 supporting the transverse angle bars 3—3', which are bolted to each other and bolted to the longitudinal beams and the longitudinal plates 4', in which latter are holes which form a bearing support for the stakes 5', connected together by a chain 6'. Resting on the transverse angle bars 3—3' are the floor plates 4'—4', and fastened to the front edge of said floor is the corrugated plate 7', projecting forwardly from which is the foot rail 8'.

In Figs. 18 to 23 inclusive I have illustrated a further modification of the body portion of my vehicle, in which 1 indicates the longitudinal L-shaped beams supported upon which and in the manner hereinbefore described are the transverse angle bars 3—3, bolted to which are the upright angle bars 2—2, and extending lengthwise of the side portions are the longitudinal plates 4 and the floor plates 4', to the front edge of which is attached the dash-board 50, the rail 51 and the supporting angle piece 53, all arranged in the manner hereinbefore described. In this modification the vertical bars 2—2 are cut off a short distance above the flooring. Fastened to the outside panels 14' are the brackets 59, having their inner vertical portions curved to conform with the surfaces of the beam and plate bounding the upper edge of the panel. Secured to said brackets are the shelves 60, terminating at their inner edges with the outer edges of the body and flush with the top edges of the panel 14' and vertical angle bar 2. Bolted to the inner upper side of the panel 14' are the angle bars 61 and bolted to the outer sides of the longitudinal flanges of the walls 5 are the angle pieces 62, the latter forming a shelf which extends the entire length of the wagon, but which is slotted to admit the projecting transverse flanges of the angle bars 2. (See Fig. 23.) The forward portion of the side walls thus constructed are elevated by continuing the same upwardly, as shown in Fig. 18, in which 2' represents the vertical angle bar, 14' the panel, 42' the plates inclosing the edges thereof and 43' the bound bead, all constructed in the manner as hereinbefore described. The rear end of this elevated portion is curved downwardly, thus necessitating the curving of the rear portion of the various parts, as shown in Fig. 22, which is a section taken on the line 22—22 of Fig. 18.

Bolted to the under side of the L-shaped beams 1—1 and at the rear end of the same is the transverse angle plate 64, projecting downwardly and bolted to which are the vertical struts 65 and the angle bar 67 which has its vertical flanges cut away, to enable the same to be bent at two portions, as illustrated in the dotted lines in Fig. 13. The metal plate 66 is bolted to the rear side of the angle bar 67 and to the front of angle bar 64 and strut 65. The lower ends of the strut 65 project through recesses in the plate 68, which latter is held in rigid relation with the angle bar 67 by the bolt 70 passing through the plate 69 riveted to the angle bar 67. The spring 71 is fastened in position between the plates 68 and 69 by means of the draw-bolt 70. The spring 71 is connected at its extremities by a hinge 72 to the side springs 73, which, in turn, is hinged at its forward end to the lug 74 and supported at an intermediate portion by the bearing boxes 75 of the axle.

Attached to the longitudinal angle beams 1—1 at the forward end of the same are the transverse angle plates 76, bolted to which are similar angle plates 77. To the under side of and at the extremities of the angle plates 77 are bolted the angle pieces 78 and between the angle pieces and bolted to the under side of the angle plates 77 is the angle bar 79. The angle pieces 78 and the angle bar 79 are riveted to the annular ring 80, on the under side of which and concentric with is the annular ring 81, bolted to the under side of which are the angle plates 82, and to the latter are bolted similar angle plates 83. Bolted to the under side of the angle bar 79 is a stiffening bar 79', and to the under side of the latter is a small rectangular plate 80'. These angle plates 83 extend transversely across the under side of the annular ring 81, and are supported upon and bolted to the angle bars 84—84, which converge forwardly. To the under side and at the rear of the angle bars 84 is bolted the angle plate 85, bolted to which are similar angle plates 86. To the intermediate portions of said angle bars 84 is bolted the angle plate 87, to which latter are bolted similar angle plates 88. To the angle bar 84 is bolted a similar angle bar 89, to the under side of each of which is bolted the truss 90, which supports a post 90' on its intermediate portion, which post bears on the under side of the angle plate 88. A further truss 91' connects the truss 90 with the under side of the angle bar 88. The forward end of each angle plate 89 has its vertical portion at right angles to form a tongue 91. Bolted to the forward end of the vertical portion of the angle plate 84 is the angle plate 92. Bolted to the tongue 91 and the angle plate 92 is the front angle bar of the vehicle 93, and a stiffening plate 94 is inserted at each extremity of the angle bar 93 between the tongue 91 and its front web. To the intermediate portion of said front angle bar and to the rear of the same is bolted the angle plate 95. At each end of the said front angle bar and on the top thereof is fastened the corrugated step 96 and bolted to the under side of the top web of said bar is a hanging step 97.

Between the angle plates 84 and terminating under the center of the annular plates 80 and 81 is a pole 100, adapted to be utilized when the vehicle is to be used as a wagon and drawn by horses. The inner end of this pole rests between the flanges of the angle bars 87 and 88 and is further held in position between two converging angle bars (not shown) along each side thereof, to which are attached straps 99, which pass under the same. On the top of the front angle bar 93 is a metallic plate 101, on the top of which is bolted an axle tree 102 by means of the bolt 103. To the front of the angle bar 93 is attached the double lug piece 104, which may be utilized as an attaching means for shafts. The angle plates 86 are attached to the end springs 105, which in turn are attached to the side springs 106, the latter being hinged to the lugs 107 attached to the under side of the angle piece 94. The intermediate portions of the side springs 106 are attached to journal boxes on the front axle in a well known manner. It will be seen that the parts above the annular plate 80 are all rigid with one another but not connected with the annular plate 81, which latter is rigidly connected with all the parts located below the same, the entire set of parts being supported by the springs on the axle of the vehicle. The two parts, however, are connected by a king-bolt 108 passing through the angle plates 77, 79, 79′ and 80′, the annular plates 80 and 81 and the angle bars 82 and 83. Thus two annular plates 80 and 81 may be revolved relatively to one another in the usual manner of the fifth wheel construction. In certain locations any shaped structural bars may be substituted for the single or double angle bars, and either web of the latter may be utilized to effect the same result.

Figure 10:
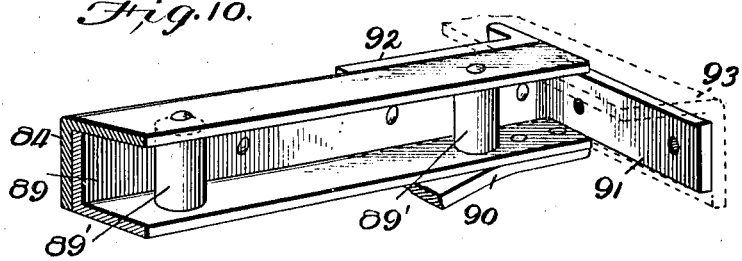
Figure 11:
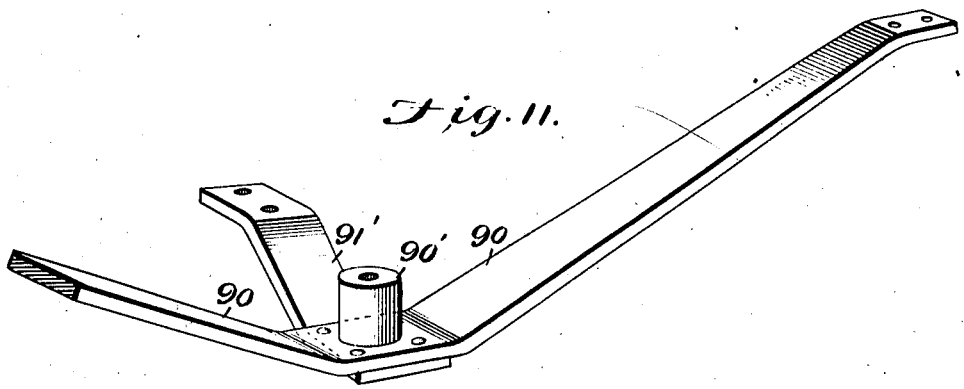

Throughout the construction of my vehicle, wherever two angle bars are bolted together so that they present two parallel webs having a space between them, I interpose between such webs metal posts 89′. These posts have a passage, through which may pass a bolt, and thus serve to resist the compression of an inward bending of the webs when the bolts are tightened, as in a draw-bolt construction, as illustrated in the case of the king-bolt 108 in Fig. 2, or when any other force is applied to the outside of the webs. In Figs. 5 and 6 these posts assist the webs in supporting the heavy floor plates 4′, and when converging bars are made up of two angle bars, as shown in Fig. 10, the said posts 89′ add greatly to the strength and stiffness of the bars. The bolts passing through these posts and those used throughout the vehicle may be of any suitable construction, and may have angular or round shoulders, and their heads may be countersunk. Wherever desirable, the extremities of the bolts may be screw-threaded to receive nuts, or may be struck or swaged into a rivet like head.

Although I have described the different parts of the vehicle as being made of metal, it is obvious that any suitable material may be substituted, as in the case of the panels or covers, where any stiff sheet material, such as wood, composition, etc., may be utilized, and in the case of covers not to be used as panels, as on the top of the vehicle, where any suitable covering material may be used. I have described the plate 16, to which a metal sheet may be soldered, as being made of brass, but any other metal may be used in this location to which solder will adhere. The finish of the different parts of my vehicle may be such as to suit the taste as, for instance, the panels, beads and border plates may be galvanized, painted or enameled.

Although I have described my vehicle as a wagon, yet I do not wish to limit myself to any such use, as I may adapt the same to motor vehicles, railroad cars, etc.

I have used various expressions throughout this specification, to clearly identify the various parts, but I do not wish to be limited to such, as I may depart from the exact structure shown and described, and utilize any of the well known equivalents thereof, provided the same are within the scope of my invention, as set forth in the appended claims.

Having thus described my invention what I claim and desire to protect by Letters Patent of the United States is:

1. A vehicle body comprising sheet metal side covers and interior side walls, each cover and wall being spaced apart and supported by angle bars forming a part of the frame structure of the body portion, and a sheet metal plate secured to the upper edge of each wall to close the spaces between each cover and wall.

2. In a vehicle body having vertical angle bars as a part of its frame structure, sheet metal side covers and interior walls, each cover and wall being spaced apart and supported by said vertical angle bars, and metal plates for closing the top and bottom of said spaces.

3. In a vehicle body having vertical angle bars as a part of its frame structure, sheet metal side covers and interior walls, each cover and wall being spaced apart and supported by said vertical angle bars, and metal plates recessed to accommodate the vertical angle bars for closing the top and bottom of said spaces.

4. In a vehicle body having vertical angle bars as a part of its frame structure, sheet metal side covers and interior walls, each cover and wall being spaced apart and supported by said vertical angle bars, metal plates for closing the top and bottom of said spaces, and longitudinal angle pieces for securing said walls to the bottom plate.

5. In a vehicle body having vertical angle bars as a part of its frame structure, sheet metal side covers and interior walls, each cover and wall being spaced apart and supported by said vertical angle bars, metal plates for closing the top and bottom of said spaces, and vertical angle pieces for securing said walls to said vertical angle bars.

6. In a body portion of a vehicle, longitudinal L-shaped floor beams, a plurality of transverse angle bars having their top portions flush with the top portions of said beams, vertical angle bars having their lower ends resting on the webs of said beams, longitudinal side plates supported on said transverse angle bars and recessed at their intersection with the vertical angle bars, side covers secured against the outer sides of said vertical angle bars, interior side walls secured to the inner sides thereof, said side walls having their upper edges terminating intermediate the ends of said vertical bars, plates secured to the inner walls to cover the spaces between the covers and walls, said plates being recessed to permit the passage of the vertical angle bars therethrough.

7. A vehicle body comprising sheet metal side members and interior wall members, said members being spaced apart and supported by a part of the frame structure of the body portion, and a sheet metal plate secured to one of said members to close the space between the same.

8. In a vehicle body having a substantially vertical bar as a part of its frame structure, a sheet metal side cover and an interior wall, said cover and wall being spaced apart and supported by said vertical bars, and a metal plate recessed to accommodate the said vertical bars for closing the top of the space between said cover and wall.

9. A cover for a vehicle comprising a series of vertical bars forming the sides thereof, a covering secured to the outer sides of said bars, a wall secured to the inner sides of said bars adjacent to the bottom thereof, the top of said wall being concave between said bars and a concave plate closing the space between said wall and said covering at the top of said inner wall.

10. A cover for a vehicle comprising a series of vertical bars forming the sides thereof, a covering secured to the outer sides of said bars, a wall secured to the inner sides of said bars adjacent to the bottom thereof, and a plate closing the spaces between said wall and said covering at the top of said inner wall, the said plate being provided with downwardly extending ears secured to said inner wall.

11. A cover for a vehicle comprising a series of vertical bars forming the sides thereof, a covering secured to the outer sides of said bars, a wall secured to the inner sides of said bars adjacent to the bottom thereof, the top of said wall being concave between said bars and a concave plate closing the space between said wall and said covering at the top of said inner wall, said plate being provided with downwardly extending ears secured to said inner wall.

12. In a vehicle, side covers and interior side walls spaced apart and having vertical angle bars between them, longitudinal plates covering said spaces between said covers and walls, a part of each cover having a cut away portion between two of the vertical angle bars, and a window frame guided by the webs of said angle bars and adapted to rest on said longitudinal plates when in its lowered position.

In witness whereof I have hereunto set my hand this 29th day of March, A. D., 1906.

JOHN REPETTO.

Witnesses:
WALTER A. HOLDEN,
ALEXANDER PARK.